US012173542B2

(12) United States Patent
Liermann

(10) Patent No.: US 12,173,542 B2
(45) Date of Patent: Dec. 24, 2024

(54) DOOR HINGE

(71) Applicant: Nicolas Liermann, Rheda-Wiedenbrueck (DE)

(72) Inventor: Nicolas Liermann, Rheda-Wiedenbrueck (DE)

(73) Assignee: SIMONSWERK GMBH, Rheda-Wiedenbrueck (DE)

( * ) Notice: Subject to any disclaimer, the term of this patent is extended or adjusted under 35 U.S.C. 154(b) by 168 days.

(21) Appl. No.: 17/902,062

(22) Filed: Sep. 2, 2022

(65) Prior Publication Data

US 2023/0151661 A1 May 18, 2023

(30) Foreign Application Priority Data

Nov. 16, 2021 (DE) ......................... 102021129910.1

(51) Int. Cl.
*E05D 7/04* (2006.01)

(52) U.S. Cl.
CPC ...... *E05D 7/0423* (2013.01); *E05Y 2900/132* (2013.01)

(58) Field of Classification Search
CPC .................................................... E05D 7/0423
See application file for complete search history.

(56) References Cited

U.S. PATENT DOCUMENTS 974,451 A * 11/1910 Vanderveld ........... E05D 7/0423 16/245
5,632,064 A * 5/1997 Lautenschlager ......... E05D 5/08 16/382
5,799,370 A * 9/1998 Davidian .............. E05D 7/0415 16/241
6,463,626 B1 * 10/2002 Ferrari .................. E05D 7/0423 16/236
6,715,181 B1 * 4/2004 Fries .......................... E05D 7/12 16/272
9,169,681 B2 * 10/2015 Cooper ..................... E05D 3/14
10,081,975 B2 * 9/2018 Cooper ................. E05D 7/0415
10,458,168 B2 * 10/2019 Hammerer ............ E05F 1/1253
2002/0000021 A1 * 1/2002 Domenig .............. E05D 7/0423 16/240
2003/0088943 A1 * 5/2003 Neukotter ............. E05D 7/0423 16/366
2004/0163211 A1 * 8/2004 Rucker ................. E05D 7/0415 16/235
2004/0163212 A1 * 8/2004 Isele ................... E05D 11/1014 16/235
2004/0163213 A1 * 8/2004 Isele ..................... E05D 7/0407 16/245

(Continued)

FOREIGN PATENT DOCUMENTS

DE 4418082 B 9/1995
DE 202010010645 U 11/2010

*Primary Examiner* — Jason W San
(74) *Attorney, Agent, or Firm* — Andrew Wilford

(57) ABSTRACT

A door hinge has a first leaf assembly, a second leaf assembly pivotally mounted on the first leaf assembly, a first adjustment part on the first leaf assembly, and a second adjustment part adjustable in an adjustment direction relative to the first adjustment part. An eccentric mounted on the first adjustment part for rotation about an eccentric axis engages in the second adjustment part. A screw thread connection secures the eccentric to the first adjustment part.

16 Claims, 5 Drawing Sheets

(56) References Cited

U.S. PATENT DOCUMENTS

2004/0200035 A1* 10/2004 Fries .......................... E05D 7/04 16/238
2006/0137139 A1* 6/2006 Wu ........................ E05D 7/0423 16/236
2008/0307606 A1* 12/2008 Karlsson ............... E05D 7/0415 16/245
2010/0122431 A1* 5/2010 Neukoetter ............. E05D 3/186 16/237
2011/0072617 A1* 3/2011 Lin .......................... E05F 5/006 16/298
2011/0291538 A1* 12/2011 Brunnmayr ............. E05D 11/08 16/382
2012/0180396 A1* 7/2012 Liermann ............... E05D 3/186 16/369
2012/0266412 A1* 10/2012 Liermann ............. E05D 7/0423 164/91
2012/0291222 A1* 11/2012 Liermann ................. E05D 7/04 16/237
2012/0291225 A1* 11/2012 Liermann ............... E05D 3/186 16/364
2013/0239363 A1* 9/2013 Çapur ..................... E05F 5/006 16/50
2013/0305487 A1* 11/2013 Hagspiel ............... E05D 7/0407 16/235
2014/0215761 A1* 8/2014 Zetti ......................... E05D 3/16 16/288
2018/0216379 A1* 8/2018 Spoelstra .................. E05D 3/14
2019/0071904 A1* 3/2019 Migliorini ............. E05D 7/0415
2023/0151655 A1* 5/2023 Liermann ................. E05D 3/06 16/233
2023/0151657 A1* 5/2023 Ellefred .................. E05D 3/186 16/358
2023/0151658 A1* 5/2023 Liermann ................. E05D 7/00 16/223
2023/0151659 A1* 5/2023 Liermann ........... E05D 11/0027 16/233
2023/0151660 A1* 5/2023 Liermann ............... E05D 3/186 16/233
2023/0151661 A1* 5/2023 Liermann ............. E05D 7/0415 16/221

* cited by examiner

Fig. 6A
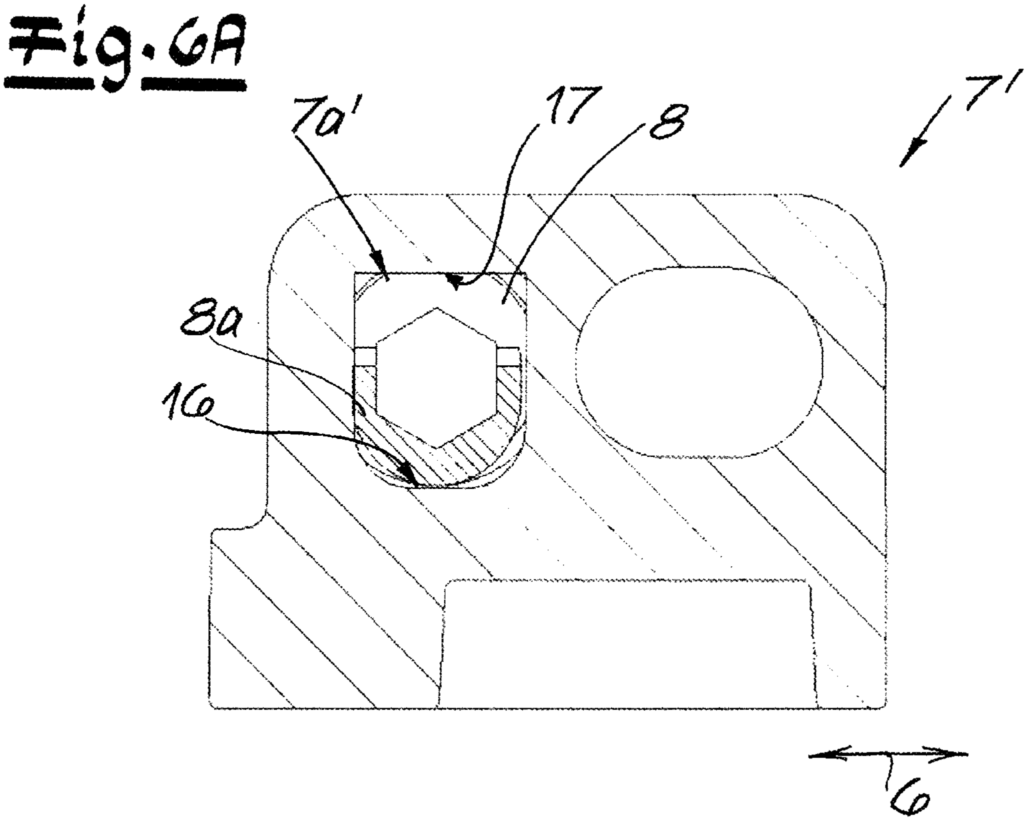
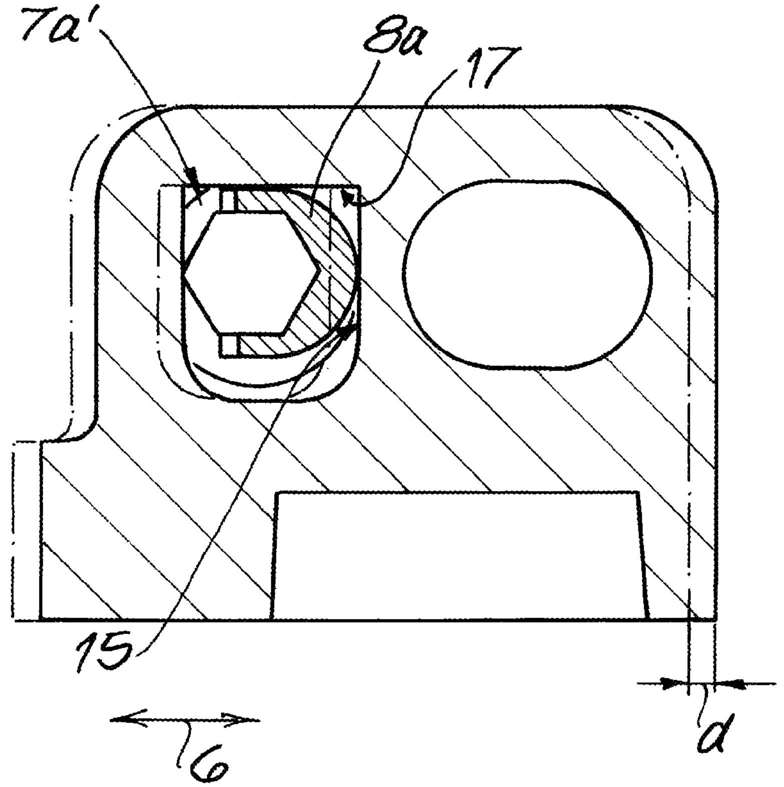
Fig. 6B

DOOR HINGE

FIELD OF THE INVENTION

The present invention relates to a door hinge.

BACKGROUND OF THE INVENTION

A known door hinge has a first leaf assembly and a second leaf assembly pivotally mounted on the first leaf assembly. Also, the first leaf assembly has a first adjustment part and a second adjustment part movable in an adjustment direction relative to the first adjustment part. An eccentric on the first adjustment part is rotatable about an axis and engages the second adjustment part.

Door hinges serve to pivotally connect a door panel with a door frame defining a door opening. The first leaf assembly and the second leaf assembly are fixed to the door panel and/or the frame. The pivotal connection of the first leaf assembly with the second leaf assembly ensures pivoting of the door panel between a closed position at least partially closing the door opening and an open position freeing the door opening. The pivot connection of the first leaf assembly with the second leaf assembly can be arbitrarily designed within the framework of the invention. For this purpose for example constructions are known in which the first leaf assembly pivots with a door pin defining a hinge axis on the second leaf assembly. However, the invention is equally applicable to other hinge constructions, in particular so-called multijoint hinges. These have at least two hinge brackets that are connected to each other so as to be pivotal and that are held on the first leaf assembly and the second leaf assembly so as to be pivotally movable and/or guided.

The production and installation of doors and door hinges entails tolerances for exactly positioning the door panel in the door opening. Also wear and settlement phenomena can be compensated for with the help of such adjustments. Usually one differentiates between vertical adjustment, horizontal adjustment as well as pressing adjustment. Since a door panel is usually carried on at least two vertically spaced door hinges on the door frame, a differential adjustment of several door hinges makes a tilting of the door panel possible.

For such adjustment, one of the two leaf assemblies has two adjustment parts of which one is (directly or indirectly) fixed to a door panel or a frame and the other adjustment part is pivotally connected with the other leaf assembly. Relative displacement of the two adjustment parts against each other on the door hinge and the door frame effectively displaces them relative to each other in the adjustment direction. To provide multiaxis adjustment, at a leaf assembly can have several (effective in different adjustment directions) adjustments that can act one after the other and/or on both leaf assemblies.

In order to enable a precise adjustment of the first adjustment part with respect to the second adjustment part in the adjustment direction, they are usually provided with an actuator. The invention proceeds thereby from a construction with an eccentric as actuator. This way, mechanical coupling of the eccentric of the first adjustment part relative to the second volume part eccentric to the eccentric axis results from rotation of the eccentric that is converted directly into linear displacement of the first adjustment part relative to the second adjustment part in the adjustment direction.

Such eccentrics are known from the state of the art. It does not address the difficulty that a force load of the two adjustment assemblies oppositely in the adjusting direction is converted into rotation of the eccentric. Accordingly, in the prior art locking systems are always used to inhibit and/or block relative movement of the two adjustment parts except when released for the purpose of adjustment. For this in many cases clamping screws have been provided that brace the first adjustment part and the second adjustment part perpendicular to the adjustment direction against each other and thereby effect frictional locking. Nevertheless, two separate tools are required for adjustment, namely for loosening the clamping screws and for operating the eccentric, so that the eccentric does not move after the clamping screws are loosened or before they are tightened under the action of a counterforce.

OBJECTS OF THE INVENTION

It is therefore an object of the present invention to provide an improved door hinge.

Another object is the provision of such an improved door hinge that overcomes the above-given disadvantages, in particular that is particularly easy to adjust.

SUMMARY OF THE INVENTION

Starting from the generic door hinge described above, the eccentric according to the invention is mounted on the first adjustment part with a screw thread.

The use according to the invention of a threaded connection has several advantages. On the one hand the contact area between the eccentric and the first adjustment part is increased in comparison to a simple sleeve bearing. This leads to greater self-locking of the eccentric, so that it can without additional locking means hold the door hinge in position at least for a short time. In addition horizontal forces (in the adjustment direction) on the eccentric lead to binding of the thread that also reinforces self-locking. For purposes of adjustment of the door hinge, this second aspect can dealt with by alignment along the eccentric axis of the eccentric to be cancelled, in particular with an adjustment tool. A further aspect in the framework of the embodiment according to the invention is that rotation of the eccentric is based on and/or influenced by its linear positioning along the eccentric axis. Due to the improved self-locking of the eccentric, this can at least in the short term absorb the encountered forces to ensure blocking of adjustment between the first adjustment part and the second adjustment part without having to hold the eccentric with force. Rather, a single tool can adjust first the eccentric purposefully and subsequently the same tool can activate any clamping means. This simplifies adjustment of the door hinge considerably.

Preferably the eccentric has a cylindrical externally threaded section that engages in an internally threaded bore of the first adjustment part. For this purpose only minor modifications are required during the manufacture of the door hinge. Both the first adjustment part and the eccentric can be manufactured almost unchanged compared to a generic door hinge. The threaded components need only be slightly redimensioned for formation with the required complementary thread formations.

In the framework of the invention the cylindrical threaded section does not have to be fully continuously cylindrical formed, but may have unthreaded portions, in particular flats. One or several flats uniformly distributed on the outer surface of the cylinder section can in particular serve for engagement by a holding or turning tool during the assembly. Furthermore the flats can also be effective as clearly visible indicators for the rotation position of the eccentric.

According to a preferred embodiment of the invention a coupling formation eccentric to the eccentric axis is connected to the threaded section and engages the second adjustment part. This way the coupling formation and the threaded section are connected in the direction of the eccentric axis especially preferably directly to each other. The eccentric formation of the coupling formation comes from the basic functionality of the eccentric that converts rotation into linear movement.

In order to save material, the coupling formation may in particular be formed as a thin collar having a thickness of not more than 2 mm. The outer surface of the collar engage the second adjustment part.

According to a preferred embodiment the coupling formation has a rounded, in particular part-circularly arcuate outer shape. The circularly arcuate shape enables contact with a flat contact surface of the second adjustment part for transition and stepless rotary movement without intermediate resistance.

The collar-shaped coupling formation can preferably have beveled flanks. These have a bevel that is inclined relative to the eccentric axis by an angle of about 45°. The coupling formation at least outside the beveled flanks is completely to one side of a center plane including the axis of the eccentric.

Expediently the eccentric has a tool socket, in particular generally hexagonal. For actuation of the eccentric a hex wrench can be fitted into the tool socket. Its rotation turns the eccentric and thereby moves the first leaf assembly relative to the second leaf assembly. Preferably for eccentric adjustment there are clamping means and/or several adjustment mechanisms effective in other spatial directions and provided with a similar tool socket. It is thus possible, with the same adjustment tool to effect these adjustments and/or clampings. For the improved self-locking according to the invention a single adjustment tool is needed, and it can be moved between the tool sockets of the eccentrics and the tool socket of any associated clamping device.

According to a preferred embodiment of the invention the tool socket has an axis of symmetry in whose direction the adjustment tool can be inserted and about which it is rotated. According to a possible embodiment of the invention the axis of symmetry is coaxial to the eccentric axis. Thus the adjustment tool remains centered on the first adjustment part during rotation.

In an alternative especially preferred embodiment the symmetry axis of the tool socket is eccentric to the eccentric axis. In this case the axis of symmetry is in particular offset in direction of the coupling formation, preferably with a distance between 1 mm and 2 mm.

Quite especially preferably the axis of symmetry of the tool socket is midway between the eccentric axis and the central axis of a circularly arcuate segment of the outer surface of the coupling formation. The eccentric arrangement can due to the additional lever arm transmit more torque to the eccentric. Also actuation of the eccentric linearly moves the symmetry axis less with respect to the second adjustment part, than the factory setting. This way the tool socket can be formed smaller. This leads to a increased stability and a more compact structure.

Preferably, the door hinge has a first stop that limits movement of the eccentric parallel to the eccentric axis to a first extreme position. The stop ensures that the eccentric cannot be moved beyond the first extreme position. Due to the fixed coupling by the thread, the limited linear mobility also limits rotation of the eccentric. Thus the position of the first extreme position can be very precisely adjusted.

Particularly preferred the first stop is positioned such that the coupling formation establishes a first extreme end position of movement in the adjustment direction. Hereby the frequent problem is solved, that with eccentric adjustments rotation beyond the dead point leads to resetting of the adjustment assemblies. At the stop an operator thus also receives clear feedback that further adjustment is not possible.

Preferably, the door hinge also has a second stop that limits movement of the eccentric along the eccentric axis opposite to the first stop at a second end position. Linear and rotary movement can thus be restricted to a defined range. The coupling formation of the eccentric is in the second end position with respect to the adjustment direction in a second extreme position opposite the first extreme position.

The first stop and/or the second stop can be in particular formed by contact surfaces of the first adjustment part or of the second adjustment part. Also these stop surfaces can be on further structures on the first adjustment part or the second adjustment part. This is not limited to components of the door hinge. For example the door hinge may be formed such that the first leaf assembly can be fixed to the contact surface of a door panel or door frame and that the stop is formed at least by a part of this contact surface in the mounted state.

Particularly preferred the first adjustment part and the second adjustment part are linearly constrained to each other in the adjustment direction. The forced guidance ensures that the two adjustment parts move exclusively in the adjustment direction relative to each other. Thus rotation of the eccentric is safely converted into a linear displacement along the adjustment direction.

The first adjustment part lies preferably with a first contact surface against a second contact surface of the second adjustment part flat. By this contact already a support perpendicular to the contact surfaces is provided.

In particular the first contact surface and the second contact surface extend at least in sections perpendicular to the eccentric axis. The contact surfaces can be used correspondingly with clamping screws effective parallel to the eccentric axis also for locking of the adjustment mechanism.

According to a particularly preferred embodiment, the first contact surface is formed as a projection extending in the adjustment direction and complementarily engaged in a groove in the second contact surface and/or the second contact surface has a projection extending along the adjustment direction and engaging in a complementary groove in the first contact surface form. While the contact of two plane surfaces provides support indefinite in two spatial directions, the positive engagement of a projection in a corresponding groove leads to the desired guidance. Particularly simple the groove can be in cross-section triangular, in particular in form of an equilateral triangle. This can be produced both with castings and also by a machining simply and precisely.

The projection is for provision of the desired guidance expediently formed such that it on contact between the first contact surface and the second contact surface the groove engaged on both sides. Particularly preferably the projection completely fills the groove in cross-section.

Preferably, a groove is formed on the second adjustment part in which the eccentric engages. The groove is preferably aligned perpendicular to the adjustment direction.

According to a particularly preferred embodiment of the invention, the groove has at least one stop surface for limiting rotation of the eccentric. For this purpose, the groove is in particular D shaped.

BRIEF DESCRIPTION OF THE DRAWING

The above and other objects, features, and advantages will become more readily apparent from the following description, reference being made to the accompanying drawing in which:

FIG. 6A and 6B are sectional views in different adjustment positions of the second adjustment part of FIG. 5 with the eccentric according to the invention.

SPECIFIC DESCRIPTION OF THE INVENTION

Figure 1:
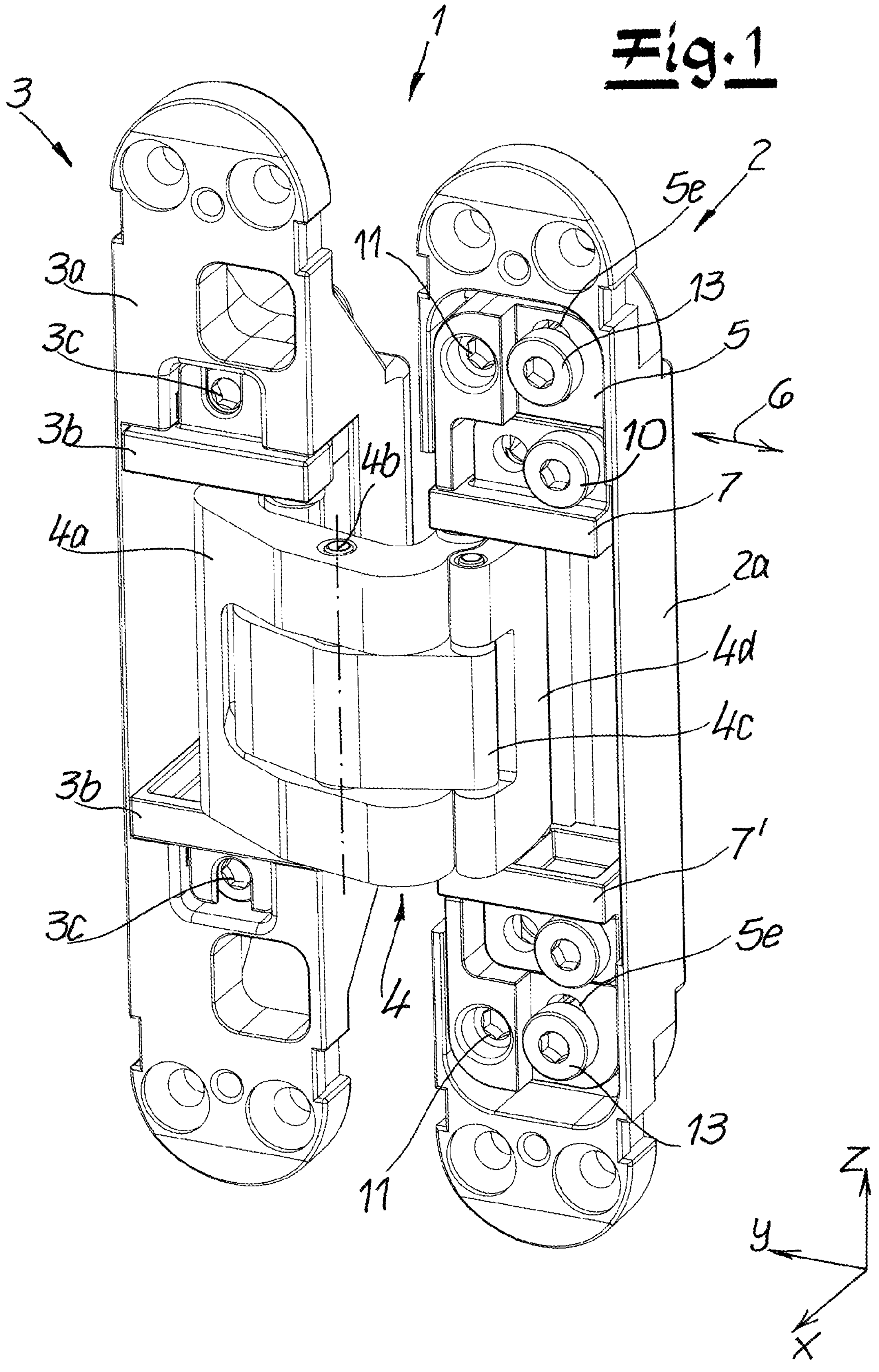
FIG. 1 is a three-dimensional view of a door hinge according to the invention.

FIG. 1 shows a door hinge according to the invention 1 with a first leaf assembly 2 and a second leaf assembly 3 pivotally mounted on the first leaf assembly 2. In the illustrated embodiment, pivoting is enabled by a swivel bracket mechanism 4 in a so-called six-axis design. The door hinge 1 extends in a horizontal direction x, a pressing direction y, and in a vertical direction z.

Figure 3A:
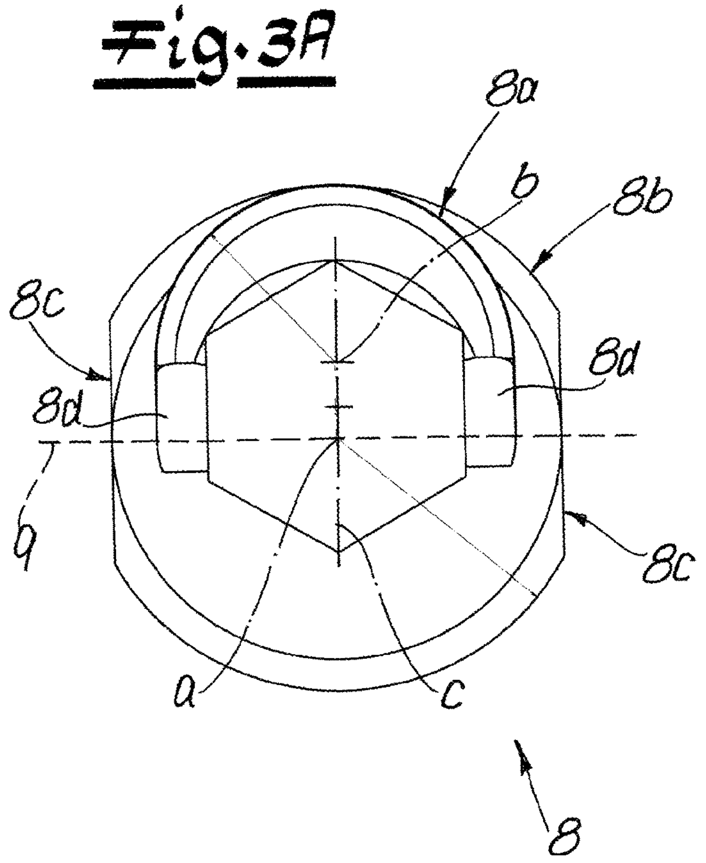
FIGS. 3A and 3B are detail views of an eccentric according to the invention.
Figure 3B:
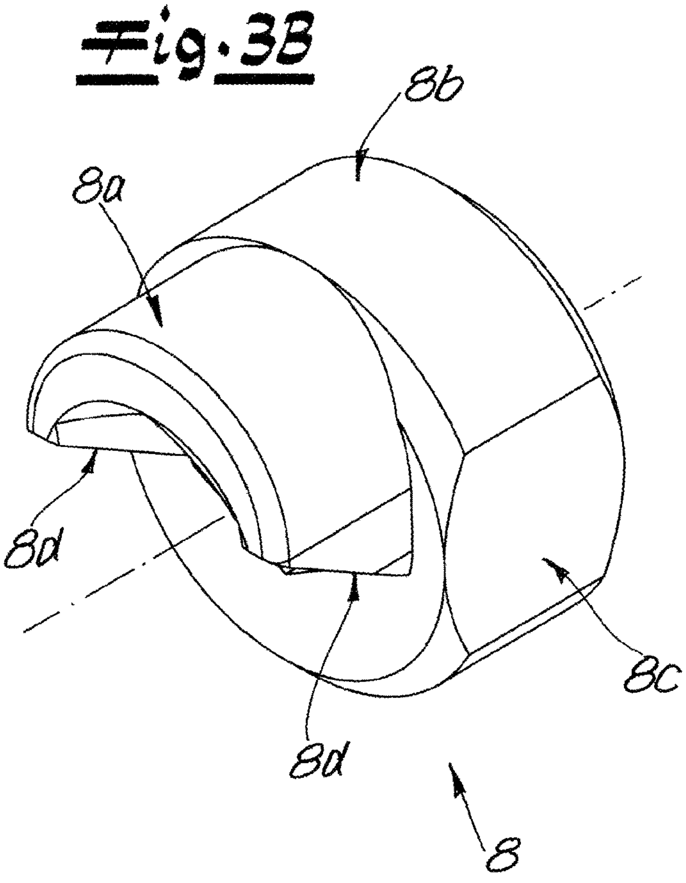
Figure 4:
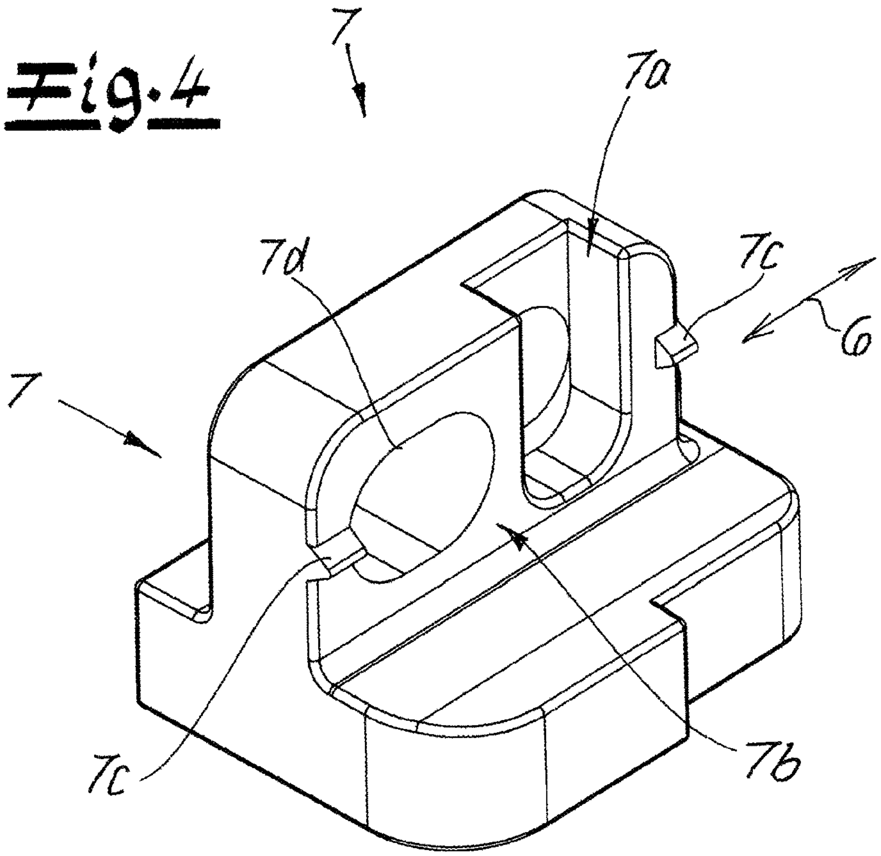
FIG. 4 is a rear view of a second adjustment part.

The first leaf assembly 2 has a first adjustment part 5 and a second adjustment part 7 movable in an adjustment direction 6 (parallel to the pressing direction y) relative to the first adjustment part 5. As one can see in the exploded view of FIG. 2, an eccentric 8 is pivotal on the first adjustment part 5 about an axis a and engages the second adjustment part 7. As FIG. 4 shows, for this purpose the rear side of the second adjustment part 7 is formed with a vertical groove 7*a* into which when assembled a coupling formation 8*a* fits complementarily. According to the invention the eccentric 8 is mounted in the first adjustment part 5 by a screw thread connection 8*b*, 5*a*. To this end the eccentric 8 has a cylindrical threaded section 8*b* concentric to the eccentric axis a and that engages in an internally threaded hole 5*a* of the first adjustment part 5. The cylindrical threaded section 8*b* is provided with two diametrally opposite flats 8*c* shown in the detail views of FIGS. 3A and 3B.

The threaded section 8*b* extending along the eccentric axis a is formed with a coupling formation 8*a* that is eccentric to the eccentric axis a and that engages in the second adjustment part 7. In the illustrated embodiment, the coupling formation 8*a* has a rounded outer shape with an outer surface formed in a semicircle about an eccentric center axis b. The radius of the outer surface around its center axis b is approximately a quarter to a third of the radius of the threaded section 8*b* around its axis a.

To save material the coupling formation 8*a* is formed as a narrow collar with beveled flanks 8*d*. Except for a small part of the slanted flanks 8*d*, the coupling formation 8*a* lies thus nearly completely on one side of a center plane 9 that includes the eccentric axis a and perpendicularly intersects the flats 8*c*.

In the illustrated embodiment the eccentric 8 has a hexagonal tool socket 8*e*. A center axis of symmetry c of the tool socket 8*e* is thereby approximately in the middle of the rounded outer surface and includes the eccentric axis a and the center axis b.

Figure 2:
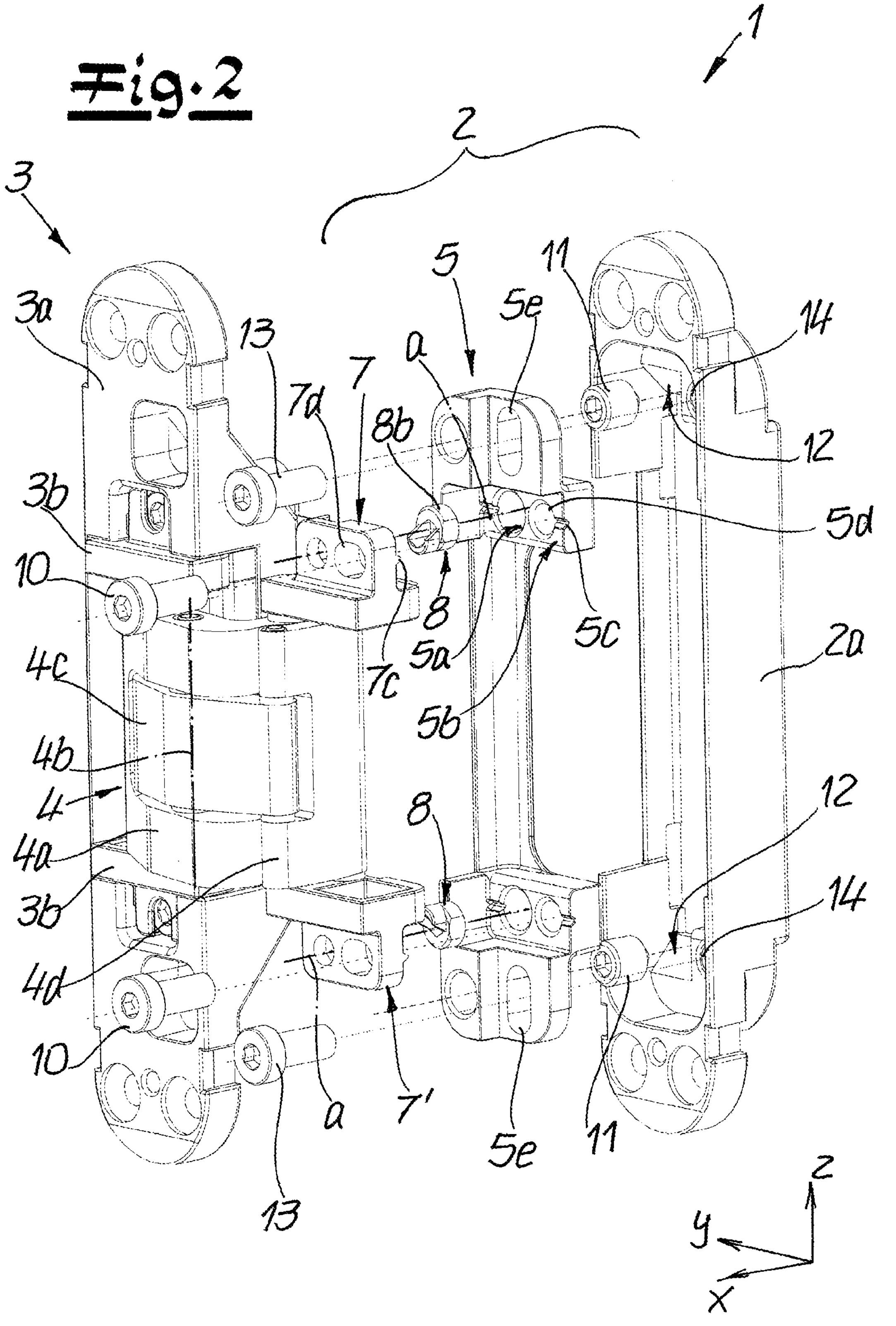
FIG. 2 is a three-dimensional view corresponding to FIG. 1 but with the first leaf assembly exploded.

As can be seen from a comparative view of FIGS. 2 and 4, the first adjustment part 5 and the second adjustment part 7 are mounted on each other to move relatively only in a straight line along the adjustment direction 6. To this end the first adjustment part 5 has a first contact surface 5*b* that flatly slides on a second contact surface 7*b* of the second adjustment part 7. The first contact surface 5*b* and the second contact surface 7*b* are thereby perpendicular to the eccentric axis a. For improvement of the constraint the second contact surface 7*b* has two triangular-section projections 7*c* that fit in a complementary groove 5*c* of the first adjustment part 5 and provide positive guidance in the adjustment direction 6.

For preventing relative movement in the pressing direction y (adjustment direction 6) a clamping screw 10 is provided that engages through a slot 7*d* in the second adjustment part 7 and is seated in a threaded bore 5*d* of the first adjustment part 5.

In the illustrated embodiment the first adjustment part 5 is formed as an intermediate piece shiftable on a base body 2*a* of the first leaf assembly 2 in the vertical direction z. For this purpose, the first adjustment part 5 holds two set screws 11 that can be moved against respective angled faces 12 of the first base body 2*a*. For vertical locking, screws 13 are provided that extend through vertically spaced and vertical slots 5*e* in the first adjustment part 5 and are screwed into respective threaded bores 14 of the base body 2*a*. Thus the first leaf assembly 2 here can be adjusted in two relatively perpendicular adjustment direction, namely in the pressing direction y as well as in the vertical direction z.

In this embodiment the door hinge 1 is a recessed door hinge with the six-axis bracket mechanism 4. Thus it has a first bracket 4*a* on the second adjustment part 7 and a mirror-symmetrical further second adjustment part 7' pivotal about a vertical axis. A second hinge bracket 4*c* is pivotal on the first hinge bracket 4*a* at a connection axis 4*b* and is also pivoted on the end of a pivot arm 4*d* of the two adjustment parts 7 and 7' of the first leaf assembly 2 and is itself pivotal about a vertical axis.

The second leaf assembly 3 has a second base body 3*a* for fastening to a door panel or frame. It holds two inserts 3*b* slidable in the horizontal direction x and holding the swivel bracket mechanism 4. The second hinge bracket 4*c* is pivotal on the two inserts 3*b* about a vertical axis. The pivot axis on the first hinge bracket 4*a* is movable in the inserts 3*b*. To adjust the door hinge 1 in the horizontal direction x, two adjustment screws 3*c* are effective between the two inserts 3*b* and the second base body 3*a*.

Figure 5:
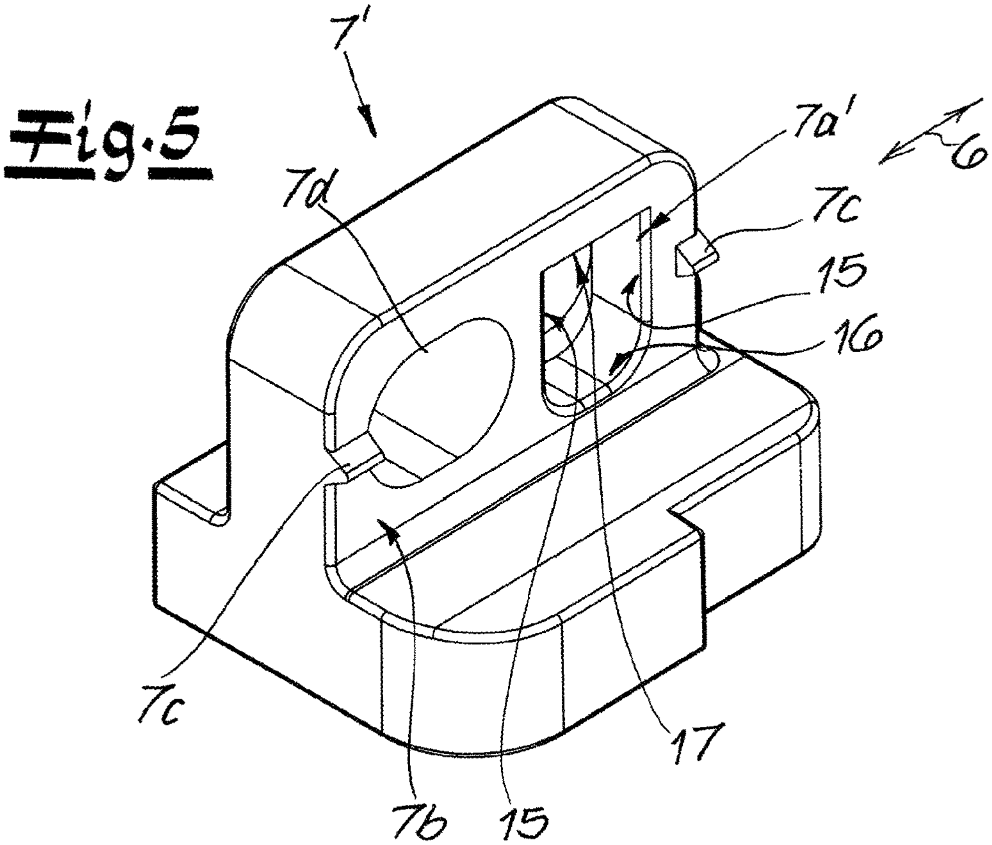
FIG. 5 is a view like FIG. 4 of a further embodiment of the second adjustment part according to the invention.

FIG. 5 shows a second adjustment part 7' according to a further embodiment. This differs from the second adjustment part 7 according to FIG. 4 exclusively by the design of the vertically extending groove 7*a'* that is provided for engagement of the eccentric 8. According to the embodiment from FIG. 5 the vertical groove 7*a'* has two vertically extending side faces 15, a rounded bottom face 16 as well as a horizontally and straight extending top face 17.

The mode of operation is shown in the FIG. 6A and 6B. FIG. 6A shows a so-called neutral position or "base position." The eccentric 8 here has its coupling formation 8*a* in the groove 7*a'*. Thereby the flanks of the coupling formation 8*a* lie on the side faces 15 and the rounded face of the coupling formation 8*a* lies on the lower face 16 with play. Thus the eccentric 8 positions the second adjustment part 7' in the adjustment direction 6 without play.

FIG. 6B shows an adjusted position in which the eccentric 8 is rotated by 90° counterclockwise. Here the second adjustment part 7' is moved into the dot/dash indicated base position in the adjustment direction 6 by an amount d. The rounded face of the eccentric 8 bears on one of the two side faces 15. At the same time the horizontal upper face 17 serves as a stop that prevents further rotation of the eccentric in the same direction of rotation in cooperation with the positive guidance in the direction of adjustment 6. Thus rotary movement of the eccentric can be restricted to the usable angular range of 180°.

I claim:

1. A door hinge comprising;

a first leaf assembly;

a second leaf assembly pivotally mounted on the first leaf assembly a first adjustment part on the first leaf assembly;

a second adjustment part adjustable in an adjustment direction relative to the first adjustment part an eccentric mounted on the first adjustment part for rotation about an eccentric axis and engaged in the second adjustment part;

a cylindrical externally threaded section on the eccentric; and an internally threaded bore of the first adjustment part fittable in the threaded section and securing the eccentric to the first adjustment part.

2. The door hinge according to claim 1, wherein the eccentric has a tool socket with an at least generally six-sided shape.

3. The door hinge according to claim 1, further comprising:

a first stop that limits linear movement of the eccentric along the eccentric axis at a first end position.

4. The door hinge according to claim 3, wherein, in the first end position, the coupling formation of the eccentric extends in the adjustment direction to a first extreme end position.

5. The door hinge according to claim 1, wherein the first adjustment part and the second adjustment part are linearly positively guided on each other in the adjustment direction.

6. The door hinge according to claim 5, wherein the first adjustment part bears in surface contact with a first contact surface against a second contact surface of the second adjustment part.

7. The door hinge according to claim 6, wherein the first contact surface and the second contact surface extend perpendicular to the eccentric axis.

8. The door hinge according to claim 7, wherein the first contact surface has a projection extending the adjustment direction and engaging complementarily in a corresponding groove of the second contact surface and/or a projection extending along the adjustment direction is formed on a second contact surface that engages complementarily in a corresponding groove of the first contact surface.

9. A door hinge comprising;

a first leaf assembly;

a second leaf assembly pivotally mounted on the first leaf assembly a first adjustment part on the first leaf assembly;

a second adjustment part adjustable in an adjustment direction relative to the first adjustment part an eccentric mounted on the first adjustment part for rotation about an eccentric axis and engaged in the second adjustment part;

a first stop that limits linear movement of the eccentric along the eccentric axis at a first end position, the eccentric having a coupling formation that, in the first end position, extends in the adjustment direction to the first end position;

a screw thread connection securing the eccentric to the first adjustment part; and a second stop that limits linear movement of the eccentric along the eccentric axis opposite to the first stop up to a second end position.

10. The door hinge according to claim 9, wherein the screwthread connection is formed by a cylindrical externally threaded section on the eccentric and an internally threaded bore of the first adjustment part.

11. The door hinge according to claim 10, wherein the cylindrical threaded section has at least one flat.

12. The door hinge according to claim 10, further comprising:

a coupling formation extending from the threaded section, eccentric to the eccentric axis, and engaging in the second adjustment part.

13. The door hinge according to claim 12, wherein the coupling formation has a rounded, part-circular outer shape.

14. The door hinge according to claim 13, wherein the coupling formation is formed as a collar with beveled flanks.

15. The door hinge according to claim 9, wherein, in the second end position, the coupling formation of the eccentric extends in the adjustment direction to a second extreme end position.

16. A door hinge comprising;

a first leaf assembly;

a second leaf assembly pivotally mounted on the first leaf assembly;

a first adjustment part on the first leaf assembly;

a second adjustment part linearly positively guided for movement on the first adjustment part in an adjustment direction, the first adjustment part bearing in surface contact with a first contact surface against a second contact surface of the second adjustment part, the first contact surface and the second contact surface extending perpendicular to the eccentric axis, one of the first and second contact surfaces being formed with a groove extending in the adjustment direction;

a projection on the other contact surface extending in the adjustment direction and engaging complementarily in the groove of the one contact surface;

an eccentric mounted on the first adjustment part for rotation about an eccentric axis and engaged in the second adjustment part; and a screw thread connection securing the eccentric to the first adjustment part.

* * * * *